United States Patent [19]

Marinaccio et al.

[11] 4,121,214
[45] Oct. 17, 1978

[54] PROXIMITY FUZE JAMMER

[75] Inventors: Richard E. Marinaccio, Crofton; Ward M. Meier, Ellicott City, both of Md.

[73] Assignee: The United States of America as represented by the Secretary of the Air Force, Washington, D.C.

[21] Appl. No.: 889,868

[22] Filed: Dec. 16, 1969

[51] Int. Cl.² ............................ G01S 7/38; H04K 3/00
[52] U.S. Cl. ................................. 343/18 E; 343/7 PF
[58] Field of Search ............... 343/6.8, 6.8 LC, 7 PF, 343/18 E

[56] References Cited

U.S. PATENT DOCUMENTS

| | | | |
|---|---|---|---|
| 3,149,284 | 9/1964 | Kishinsky | 343/6.8 |
| 3,375,515 | 3/1968 | Novikoff | 343/18 E |
| 3,504,366 | 3/1970 | Tolles et al. | 343/18 E |

Primary Examiner—Malcolm F. Hubler
Attorney, Agent, or Firm—Joseph E. Rusz; Henry S. Miller, Jr.

[57] ABSTRACT

A system for jamming continuous wave radar type proximity fuzes used on surface-to-air missiles where the fuze requires an increase in return signal power level and a rapid frequency change for detonation. The system basically includes a receiver, amplifier, and transmitter. A received fuze signal is filtered and square wave modulated then sent to a first traveling wave tube for amplification. The signal is then amplified again by a second traveling wave tube which is modulated by a transit time modulator which continuously varies the phase shift through the tube in a linear fashion. The linear variation in phase shift is the equivalent of a displacement in the frequency signal being amplified. The signal is then reradiated to the missile giving the fuze a target sensing causing it to predetonate.

2 Claims, 2 Drawing Figures

INVENTOR.
RICHARD E. MARINACCIO
WARD M. MEIER
BY Harry A. Herbert Jr.
ATTORNEY

Henry S. Miller Jr.
AGENT

PROXIMITY FUZE JAMMER

BACKGROUND OF THE INVENTION

This invention relates generally to the premature detonation of missile warheads, and more specifically to the detonation of radar operated proximity fuzes in surface to air missiles.

By retransmitting a missile radar signal it is possible to provide a missile fuze with an erroneous target indication. Although proximity and variable time fuzes have been utilized on antiaircraft artillery shells and surface to air missiles for some time, improvements have been recently made to avoid the problems of premature detonation caused by clouds, rain, objects, dropped from aircraft, and even flights of birds. As a result of these improvements, electronic countermeasures designed to degrade the performance of surface-to-air missiles has become increasingly more difficult.

Surface to air missiles presently being utilized measure the power level of the return signal and require that a predetermined threshold be exceeded before the fuze will be activated to detonate the warhead. In addition, to avoid counter measures which merely send out the appropriate signal and detonate the warhead, the recent systems require that the frequency of the received signal simultaneously undergo a rapid change indicative of missile flyby.

Therefore only the combination of an increase in power level and a simultaneous frequency change will cause the activation of the fuze and missile detonation. Hence, in order to cause a premature detonation these requirements must be met.

SUMMARY OF THE INVENTION

The method and system of this invention is a fuze jamming device which is effectually a repeating facility in which the continuous wave (CW) signal transmitted by the fuze is received, and retransmitted back to the fuze. In order to provide the fuze with the impression that it is flying by the target, the instantaneous frequency of the repeated signal is changed so as to simulate a rapidly changing doppler shift similar to that experienced by the true signal at the moment of flyby.

When considering the type of trajectory which ground-to-air missiles fly it becomes apparent that any jammer to be effective must operate into the sidelobes of the missile fuze antennas.

When examining one particular missile it has been found that the fuze threshold is −62 dbm. In order to exceed this threshold beyond the effective range of the warhead, thereby insuring the safety of an aircraft, the repeater must produce a gain in excess of 100 db.

Generally repeating-type systems provide an isolation between the transmitting the receiving antennas of approximately 70 db. When the gain exceeds this level a problem arises which is commonly termed "ring around" and relates to regeneration caused by the lack of isolation between the antennas. To prevent "ring around", a chopping technique is used which takes advantage of the inherent RF delay of the repeater chain. By gating the signal at the input to a low level traveling wave tube "On" for a period of time not to exceed the delay of the repeater and "Off" for a period of time equal to or greater than the delay, "ring around" can be prevented. To provide for the rapidly changing doppler shift of the signal (indicative of flyby) a serrodyning technique is utilized. This is achieved by a transit time modulation of the output traveling wave tube.

It is therefore an object of this invention to provide a new and improved means for prematurely detonating surface-to-air missiles.

It is another object of this invention to provide a new and improved means for jamming proximity fuzes.

It is a further object of this invention to provide a new and improved fuze jamming system which will detonate a missile warhead at a distance from the system itself that is beyond its effective warload range.

It is still another object of this invention to provide a new and improved fuze jamming system that provides for a rapid frequency change as well as increase power level to predetonate proximity fuzes.

It is still a further object of this invention to provide a new and improved proximity fuze jamming system that has high gain yet eliminates unwanted signal regeneration.

It is another object of this invention to provide a fuze jammer which is economical to produce and utilizes conventional, currently available components that lend themselves to standard mass production manufacturing techniques.

DESCRIPTION OF THE PREFERRED EMBODIMENT

Figure 1:
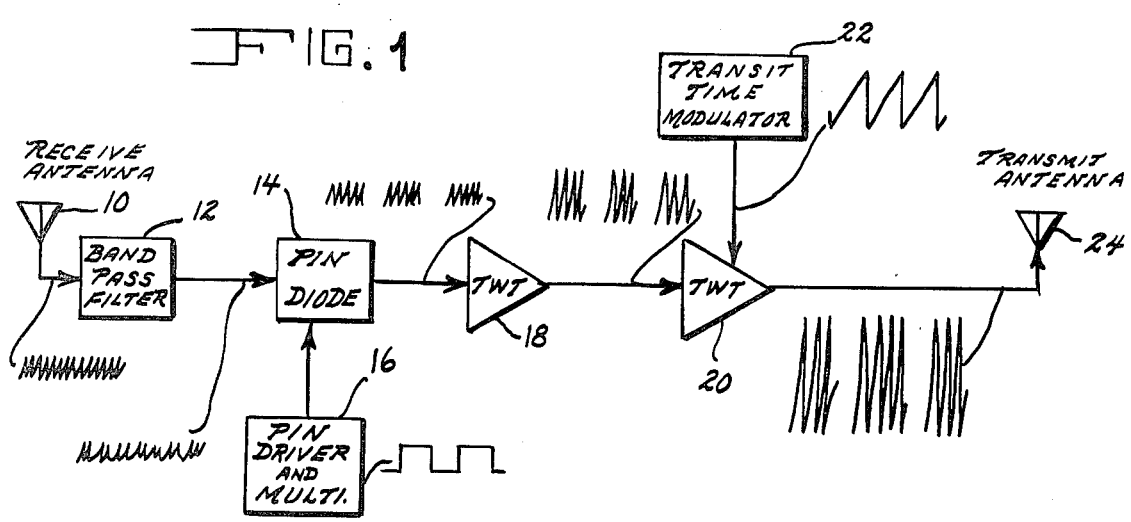
FIG. 1 is a block diagram of the system encompassed by the invention.

Referring now to FIG. 1, an aircraft is fitted with a receiving antenna 10 for detecting the radio frequency (RF) signal from an approaching missile. The RF signal is filtered by band pass filter 12 designed to limit the signals to the desired carrier and its modulated sidebands.

The signal enters the pin diode 14 which is controlled by the pin diode driver and multivibrator 16. The pin diode, a solid state switch, permits the radio frequency output of the band pass filter to either be passed to the traveling wave tube 18 where it is amplified or to be open-circuited and not passed to the traveling wave tube. The pin driver and multivibrator 16 is a multivibrator circuit which produces a square wave thereby causing the output of the pin diode to be the filtered RF received by the antenna but square wave modulated.

A second traveling wave tube 20 further amplifies the radio frequency signal as passed by the first traveling wave tube amplifier. The second traveling wave tube is modulated by the transit time modulator 22. This affects the traveling wave tube by continuously varying the phase shift through the TWT in a linear or sawtooth fashion. A linear variation in phase shift is the equivalent of a displacement in the frequency signal being amplified. For example, if a signal of frequency $F_1$ is applied to the input of the TWT, the frequency of the signal as amplified by the tube will be $F_1 + \Delta F_1$, where $\Delta F_1$ is a small increment in $F_1$. This frequency shift is accomplished in order to deceive the fuze radar into believing that the criterion for detonation prevails when the range is still great enough to be safe.

The signal leaves the second traveling wave tube and is reradiated to the missile fuze by the transmit antenna 24.

Figure 2:
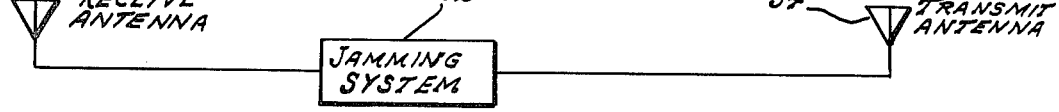
FIG. 2 is a timing diagram for the system of the invention.

In FIG. 2 there is shown a timing diagram for the signal which enters the antenna 30 and is retransmitted via transmit antenna 34 after passing through the jamming system 32.

Waveform 36 is the continuous wave RF input at the receiving antenna 30. The square wave modulation applied to the pin diode 14 is timed as shown in waveform 38. The effect of this action is to cause the transmitter to be "Off" (40) during the time the signal which it previously transmitted 42 is applied to the receiver. Hence regeneration cannot occur. In the figure $T_A$ is the delay time required for RF to propagate from transmit antenna 34 to receive antenna 30 or approximately 1 usec per 1000 feet of physical separation between antennas, while $T_T$ equals the time delay of RF through two traveling wave tube.

Regeneration, or "ring around", is the condition which exists when a signal at the output of an amplifier reaches the input, is further amplified with the amplified value again reaching the input, and continuing in this manner with the system in continuous oscillation. In this condition, amplification in a normal manner is impossible.

Having thus described our novel method and apparatus for jamming proximity fuzes, we claim the following as our invention:

1. A method for predetonating missiles having proximity fuzes which radiate and receive electromagnetic energy comprising the steps of: receiving the electromagnetic radiation radiating from a fuze at a distance beyond the missile's effective warhead range; filtering the received signal to limit the signal to the fuze carrier and its modulated sidebands; square wave modulating the filtered signal; amplifying the modulated signal a first time; amplifying the modulated signal a second time, linearly varying the phase of the second amplified signal, and retransmitting the signal to the fuze at a distance beyond the missile's effective warhead range.

2. A system for predetonating missiles having proximity fuzes which radiate and receive electromagnetic energy comprising: means for receiving electromagnetic radiation emanating from a missile fuze beyond the effective range of the missile warhead, band pass filter means for selecting the desired frequency connected to the receiving means; switching means for alternatively interrupting the signal connected to the filter; multivibrator means connected to the switch means for a activating said means; a first traveling wave tube connected to the switch means for amplifying the filtered signal; a second traveling wave tube connected to said first tube; means connected to said second tube for causing a linear phase shift in the signal as it is amplified thereby effectively frequency adjusting the received signal, and means for retransmitting the received signal.

* * * * *